United States Patent
Chou et al.

(10) Patent No.: US 10,158,519 B2
(45) Date of Patent: Dec. 18, 2018

(54) COORDINATION OF SELF-OPTIMIZATION OPERATIONS IN A SELF ORGANIZING NETWORK

(75) Inventors: Joey Chou, Scottsdale, AZ (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,374

(22) PCT Filed: Mar. 20, 2012

(86) PCT No.: PCT/US2012/029808
§ 371 (c)(1),
(2), (4) Date: Jun. 26, 2013

(87) PCT Pub. No.: WO2013/066383
PCT Pub. Date: May 10, 2013

(65) Prior Publication Data
US 2013/0279368 A1    Oct. 24, 2013

Related U.S. Application Data

(60) Provisional application No. 61/556,109, filed on Nov. 4, 2011.

(51) Int. Cl.
*H04W 24/02* (2009.01)
*H04L 27/26* (2006.01)
(Continued)

(52) U.S. Cl.
CPC ......... *H04L 27/2675* (2013.01); *H04B 7/024* (2013.01); *H04B 7/0456* (2013.01);
(Continued)

(58) Field of Classification Search
CPC . H04W 24/02; H04W 52/02; H04W 56/0015; H04W 72/0413; H04W 68/02;
(Continued)

(56) References Cited

U.S. PATENT DOCUMENTS

| 8,543,116 B2* | 9/2013 | Zhang | H04W 52/0258 |
| | | | 455/422.1 |
| 8,712,332 B2* | 4/2014 | Zhuang | H04W 24/02 |
| | | | 455/446 |

(Continued)

FOREIGN PATENT DOCUMENTS

| CN | 102056206 A | 5/2011 |
| CN | 102056336 A | 5/2011 |

(Continued)

OTHER PUBLICATIONS

Alcatel-Lucent, Capacity and Coverage SON Use case, 3GPP TSG RAN3#59, Sorrento, Italy Feb. 11-15, 2008, R3-080082.*
(Continued)

*Primary Examiner* — Shailendra Kumar
(74) *Attorney, Agent, or Firm* — Schwabe, Williamson & Wyatt, P.C.

(57) ABSTRACT

Embodiments of the present disclosure describe device, methods, computer-readable media and system configurations for coordinating a plurality of self-optimization operations, such as an energy-saving management operation and a capacity and coverage optimization operation, to reduce conflicts between changes to configuration parameters of a wireless network access node caused by the self-optimization operations. Other embodiments may be described and/or claimed.

17 Claims, 4 Drawing Sheets

(51) Int. Cl.

| | | |
|---|---|---|
| H04W 72/04 | (2009.01) | |
| H04W 4/70 | (2018.01) | |
| H04W 76/11 | (2018.01) | |
| H04W 76/40 | (2018.01) | |
| H04B 7/024 | (2017.01) | |
| H04B 7/0456 | (2017.01) | |
| H04W 4/06 | (2009.01) | |
| H04W 72/08 | (2009.01) | |
| H04W 52/24 | (2009.01) | |
| H04J 3/12 | (2006.01) | |
| H04L 5/00 | (2006.01) | |
| H04L 5/14 | (2006.01) | |
| H04W 52/14 | (2009.01) | |
| H04W 68/02 | (2009.01) | |
| H04L 1/00 | (2006.01) | |
| H04J 11/00 | (2006.01) | |
| H04L 1/18 | (2006.01) | |
| H04W 56/00 | (2009.01) | |
| H04B 7/06 | (2006.01) | |
| H04W 72/02 | (2009.01) | |
| H04W 52/34 | (2009.01) | |
| H04W 84/14 | (2009.01) | |
| H04W 88/02 | (2009.01) | |
| H04W 88/08 | (2009.01) | |
| H04W 72/12 | (2009.01) | |

(52) U.S. Cl.
CPC .............. *H04B 7/0626* (2013.01); *H04J 3/12* (2013.01); *H04J 11/00* (2013.01); *H04L 1/0026* (2013.01); *H04L 1/0077* (2013.01); *H04L 1/1812* (2013.01); *H04L 5/0035* (2013.01); *H04L 5/0053* (2013.01); *H04L 5/0055* (2013.01); *H04L 5/0078* (2013.01); *H04L 5/14* (2013.01); *H04L 27/2646* (2013.01); *H04L 27/2662* (2013.01); *H04W 4/06* (2013.01); *H04W 4/70* (2018.02); *H04W 24/02* (2013.01); *H04W 52/146* (2013.01); *H04W 52/242* (2013.01); *H04W 56/0015* (2013.01); *H04W 68/02* (2013.01); *H04W 72/02* (2013.01); *H04W 72/042* (2013.01); *H04W 72/0413* (2013.01); *H04W 72/0446* (2013.01); *H04W 72/085* (2013.01); *H04W 76/11* (2018.02); *H04W 76/40* (2018.02); *H04W 52/244* (2013.01); *H04W 52/34* (2013.01); *H04W 72/12* (2013.01); *H04W 84/14* (2013.01); *H04W 88/02* (2013.01); *H04W 88/08* (2013.01); *Y02D 70/00* (2018.01); *Y02D 70/20* (2018.01)

(58) Field of Classification Search
CPC .............. H04W 76/021; H04W 76/002; H04W 52/146; H04W 52/242; H04W 72/085; H04W 4/005; H04W 4/06; H04W 72/042; H04W 88/02; H04W 84/14; H04W 52/244; H04W 52/34; H04L 27/2675; H04L 27/2646; H04L 5/0035; H04L 5/0053; H04L 1/1812; H04L 27/2662; H04L 1/0077; H04L 1/0026; H04L 5/0055; H04L 5/14; H04L 5/0078; H04B 7/0626; H04B 7/0456; H04B 7/024; H04J 11/00; H04J 3/12; Y02B 60/50
See application file for complete search history.

(56) References Cited

U.S. PATENT DOCUMENTS

| | | | |
|---|---|---|---|
| 2004/0268355 A1* | 12/2004 | Robin .................... G06F 9/52 | 718/100 |
| 2006/0253570 A1 | 11/2006 | Biswas et al. | |
| 2010/0309799 A1* | 12/2010 | Nunzi .................. H04L 41/044 | 370/252 |
| 2011/0045865 A1 | 2/2011 | Viering et al. | |
| 2012/0307697 A1* | 12/2012 | Mukhopadhyay .... H04W 4/001 | 370/311 |
| 2013/0130670 A1* | 5/2013 | Samdanis ............ H04W 24/02 | 455/418 |
| 2013/0229943 A1* | 9/2013 | Huang .................. H04W 52/12 | 370/252 |
| 2013/0237201 A1* | 9/2013 | Futaki .................. H04W 24/02 | 455/418 |

FOREIGN PATENT DOCUMENTS

| | | | |
|---|---|---|---|
| EP | 2544485 A1 * | 4/2011 | |
| EP | 2544485 A1 * | 1/2013 | |
| WO | WO2010104143 A1 | 9/2010 | |
| WO | WO 2011/050753 A1 | 5/2011 | |
| WO | WO2011134401 A1 | 11/2011 | |

OTHER PUBLICATIONS

3rd Generation Partnership Project, Technical Specification Group Radio Access Network; Evolved Universal Terrestrial Radio Access Network (E-UTRAN); Self-configuring and self-optimizing network (SON) use cases and solutions, (Release 9), Mar. 2011, 3GPP TR 36.902 V9.3.1 (Mar. 2011).*

Cai et al., Coverage and Capacity Optimization in E-UTRAN Based on Central Coordination and Distributed Gibbs Sampling, Vehicular Technology Conference (VTC 2010—Spring), 2010 IEEE 71st, May 16-19, 2010 Taipei; IEEE, ISBN: 978-1-4244-25181), p. 1-5.*

Bandh et al., Policy-based Coordination and Management of SON Functions, May 23, 2011, 12th IFIP/IEEE International Symposium on Integrated Network Management, proceedings pp. 827-840.*

Schmelz et al.,A Coordination Framework for Self-Organisation in LTE Networks, 12th IFIP/IEEE International Symposium on Integrated Network Management, May 23-27, 2011.*

3GPP, "3rd Generation Partnership Project; Technical Specification Group Services and System Aspects; Telecommunication management; Study on Energy Savings Management (ESM) (Release 10)," 3GPP TR 32.826 VI0.0.0 (Mar. 2010).*

3rd Generation Partnership Project; Technical Specification Group Services and System Aspects; Telecommunication management; Study on Energy Savings Management (ESM) (Release 10),3GPP TR 32.826 V10.0.0 (Mar. 2010).*

Bandh et al., Policy-based Coordination and Management of SON Functions, 2011 IFIP/IEEE International Symposium on Integrated Network Management (IM), May 23-27, 2011.*

Schmelz et al.,A coordination framework for self-organisation in LTE networks, 2011 IFIP/IEEE International Symposium on Integrated Network Management (IM), May 23-27, 2011.*

Notification Concerning Transmittal of International Preliminary Report on Patentability dated May 15, 2014 from International Application No. PCT/US2012/029808.

International Search Report and Written Opinion dated Oct. 23, 2012 from International Application No. PCT/US2012/029808.

LTE, "Evolved Universal Terrestrial Radio Access (E-UTRA) and Evolved Universal Terrestrial Radio Access Network (E-UTRAN); Overall description; Stage 2 (Release 9)," 3GPP TS 36.300 version 9.8.0, Sep. 30, 2011, See p. 149-160.

ZTE, China Mobile, "New SON use-case: Self-Optimization for Coverage Compensation," 3GPP TSG-RAN WG3 Meeting#58, R3-072179, Nov. 5-9, 2007, Jeju, Korea.

Office Action dated Apr. 7, 2015 from Canadian Patent Application No. 2850124.

(56) References Cited

OTHER PUBLICATIONS

Office Action dated Nov. 24, 2015 from Australian Patent Application No. 2012333237.
Office Action dated Mar. 30, 2015 from Russian Patent Application No. 2014117727.
Cai et al., "Coverage and Capacity Optimization in E-UTRAN based on Central Coordination and Distributed Gibbs Sampling," Vehicular Technology Conference (VTC 2010 2010—Spring) 2010 IEEE 71st, Taipei, May 16-19, 2010, 5 pages.
CMCC, "Dependencies among SON use cases and CCO priority," 3GPP TSG-RAN WG3 Meeting #64, R3-091032, Agenda item: 10.1, May 4-May 8, 2009, San Francisco, US, 3 pages.
Nokia Siemens Networks, "SON conflict resolution," 3GPP TSG-SA5 (Telecom Management), S5-093241, Meeting SA5#67, Agenda Item: 6.5.1, Aug. 31-Sep. 4, 2009, Vancouver, Canada, 3 pages.
Orange, et al., "Proposed Input for Energy Savings Management," 3GPP TSG-SA5 (Telecom Management), S5-091857, Meeting SA5#64, Agenda Item: 6.10.5—Study on Energy Savings Management, Mar. 30-Apr. 3, 2009, Hangzhou, China, 4 pages.
Nokia Siemens Networks et al., "Policy-based Coordination and Management of SON Functions," 12th IFIP/IEEE IM 2011: Application Session, Nov. 15, 2010, 14 pages.
Office Action dated Jun. 2, 2015 from Japanese Patent Application No. 2014-539919.
Office Action dated May 15, 2015 from Mexican Patent Application No. MX/a/2014/005393.
3GPP, "Technical Specification Group Services and System Aspects; Telecommunication management; Self-Organizing Networks (SON) Policy Network Resource Model (NRM) Integration Reference Point (IRP); Information Service (IS) (Release 9)," 3GPP TS 32.522 V9.2.0 (Dec. 2010), Lte, 21 pages.
3GPP, "Technical Specification Group Services and System Aspects; Telecommunication management; Self-Organizing Networks (SON) Policy Network Resource Model (NRM) Integration Reference Point (IRP); Information Service (IS) (Release 10)," 3GPP TS 32.522 V10.2.0 (Jun. 2011), Lte Advanced, 33 pages.
3GPP, "Technical Specification Group Services and System Aspects; Telecommunication management; Self-Organizing Networks (SON) Policy Network Resource Model (NRM) Integration Reference Point (IRP); Information Service (IS) (Release 11)," 3GPP TS 32.522 V11.0.0 (Sep. 2011), Lte Advanced, 33 pages.
Final Rejection dated Feb. 15, 2016 from Korean Patent Application No. 10-2014-7011844, 6 pages.
Office Action dated Jun. 1, 2016 from Korean Divisional Application No. 10-2016-7007007, 10 pages.
3GPP, "Technical Specification Group Services and System Aspects; Telecommunicaton management; Study on Energy Savings Management (ESM) (Release 10)," 3GPP TR 32.826 V10.0.0, (Mar. 2010), Lte, 33 pages.
Schmelz et al., "A Coordination Framework for Self-Organisation in LTE Networks," 12th IF IP/IEEE International Symposium on Integrated Network Management 2011, May 23, 2011, pp. 193-200, 8 pages.
Extended European Search Report dated Sep. 19, 2016 for European Patent Application No. 16176396.6, 12 pages.
Notice of Final Rejection dated Dec. 2, 2016 from Korean Divisional Application No. 10-2016-7007007, 13 pages.
Second Final Rejection dated Mar. 7, 2017 from Korean Divisional Application No. 10-2016-7007007, 12 pages.
Office Action dated Apr. 18, 2017 from Japanese Divisional Application No. 2016-058005, 7 pages.
Examiner's Report dated Apr. 26, 2017 from Canadian Divisional Application No. 2,932,387, 3 pages.
Notice of Last Preliminary Rejection dated Dec. 8, 2017 from Korean Divisional Application No. 10-2017-7009532, 7 pages.
Office Action dated Nov. 15, 2017 from Malaysian Patent Application No. PI 2014701045, 3 pages.
Second Office Action dated Oct. 11, 2017 from Chinese Patent Application No. 201280054285.6, 7 pages.
Notice of Preliminary Rejection dated Jun. 16, 2017 from Korean Divisional Application No. 10-2017-7009532, 17 pages.
Chinese Patent Office—Third Office Action dated Jun. 4, 2018 from Chinese Patent Application No. 201280054285.6, 6 pages.

* cited by examiner

COORDINATION OF SELF-OPTIMIZATION OPERATIONS IN A SELF ORGANIZING NETWORK

CROSS REFERENCE TO RELATED APPLICATIONS

The present application is a national phase entry under 35 U.S.C. § 371 of International Application No. PCT/US2012/029808, filed Mar. 20, 2012, entitled "COORDINATION OF SELF-OPTIMIZATION OPERATIONS IN A SELF ORGANIZING NETWORK", which designates the United States of America, and which claims priority to U.S. Provisional Patent Application No. 61/556,109, filed Nov. 4, 2011, the entire contents and disclosures of which are hereby incorporated by reference in their entireties.

FIELD

Embodiments of the present invention relate generally to the field of communications, and more particularly, to coordination of self-optimization operations in a self-organizing network ("SON").

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Wireless network access nodes ("WNANs"), such as base stations configured to operate pursuant to the IEEE 802.16 standard, IEEE Std. 802.16-2009, published May 29, 2009 ("WiMAX"), or evolved Node Bs ("eNBs") configured to operate under the 3GPP Long Term Evolution ("LTE") Release 10 (March 2011) ("LTE"), may be configured to cooperate with other WNANs to form a self-organizing network ("SON").

WNANs may be configured to perform self optimization operations. These self-optimization operations may address issues such as coverage holes, weak coverage, uplink and downlink channel coverage mismatch, and so forth. WNANs may obtain data (e.g., user equipment measurements, performance measurements, trace data, etc.) from various sources such as wireless devices (e.g., user equipment in LTE). This data may be analyzed, and configuration parameters associated with one or more WNANs may be adjusted automatically to improve network performance, coverage and/or capacity, and/or to mitigate the aforementioned issues.

Self-optimization operations may include but are not limited to load balancing, handover performance optimization, coverage and capacity optimization ("CCO"), inter-cell interference mitigation, radio/transport parameter optimization, energy-saving management ("ESM"), and so forth. ESM operations, for example, may be performed to cause certain WNANs providing cells in a SON to shut down during off-peak traffic time intervals (e.g., middle of the night), e.g., to conserve energy, and may cause other WNANs in the multi-cell network to compensate for the shut down WNANs. Self-optimization functions may be executed independently by WNANs or other network devices. However, conflicts may arise when two or more self-optimization operations attempt to tune a configuration parameter of a WNAN in a conflicting manner.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be implemented. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. As used herein, "computer-implemented method" may refer to any method executed by one or more processors, a computer system having one or more processors, a mobile device such as a smart phone (which may include one or more processors), a tablet computer, laptop computer, a set-top box, a gaming console, and so forth. As used herein, the term "self-optimization" refers to any successful or unsuccessful attempt at improvement in performance, including both relative and absolute optimization.

Figure 1:
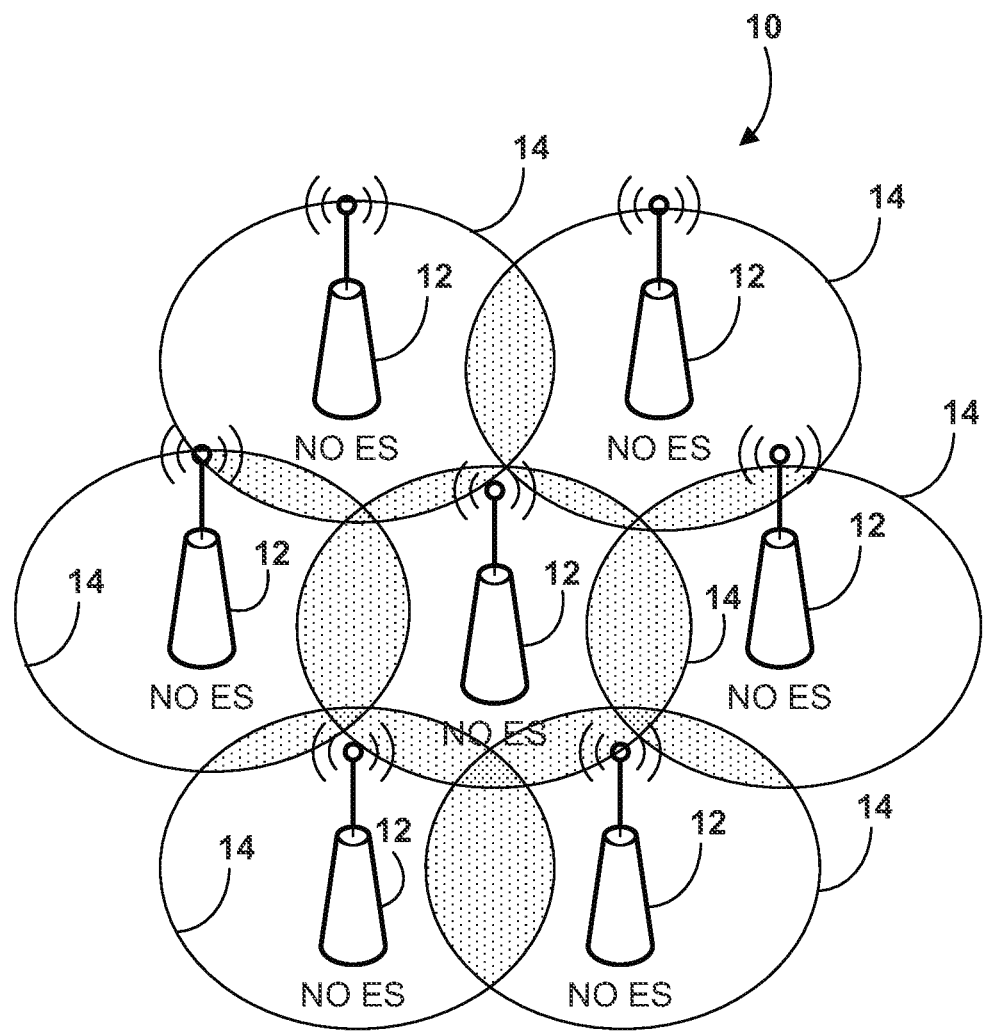
FIG. 1 schematically illustrates an example self-organizing network ("SON") of wireless network access nodes ("WNANs") operating during peak traffic, in accordance with various embodiments.

An example self-organizing network ("SON") 10 of wireless network access nodes ("WNANs") 12 is shown in FIG. 1 operating during a peak traffic situation. Each WNAN 12 of SON 10 provides a cell 14 to which one or more wireless devices (not shown), such as mobile subscribers ("MS") or user equipment ("UE") devices, may connect wirelessly. The cells 14 provided by the WNANs 12 together form a multi-cell network. In various embodiments, a WNAN may be a base station ("BS") configured to operate pursuant to WiMAX. In various embodiments, WNAN 12 may be an evolved Node B ("eNB") configured to operate in an evolved universal terrestrial radio access network ("E-UTRAN") pursuant to LTE, or other types of WNANs. In FIG. 1, traffic may be at or close to peak, and so each of the WNANs 12 shown in FIG. 1 may be operating in non-energy-saving state ("NO ES") to provide cells 14 to which a high volume of wireless devices may connect.

Figure 2:
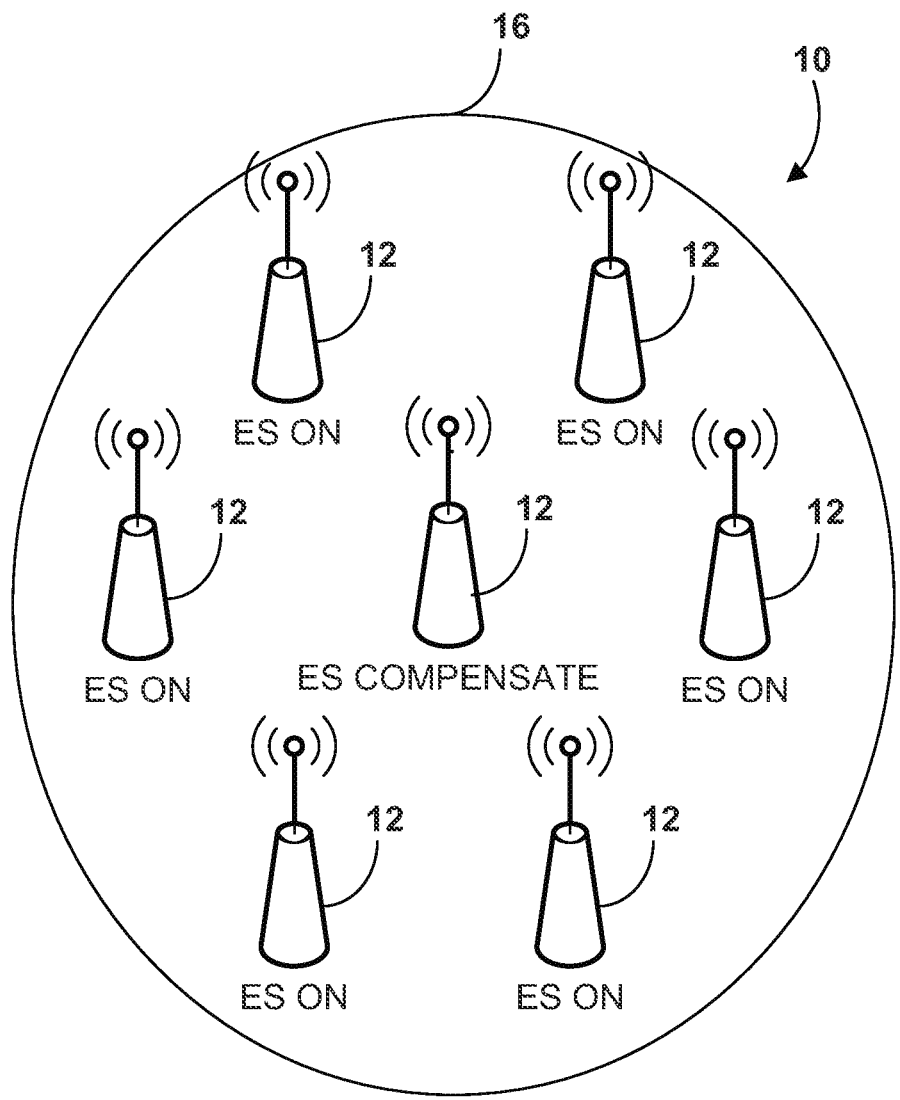
FIG. 2 schematically illustrates the example SON of WNANs of FIG. 1, operating during off-peak traffic, in accordance with various embodiments.

However, during non-peak hours, a lower volume of wireless devices may connect to the multi-cell network 14. Accordingly, as shown in FIG. 2, the WNANs 12 may perform various energy-saving management ("ESM") operations, e.g., in cooperation, to collectively conserve power. For instance, ESM operations performed by the WNANs 12 on the perimeter may include transitioning to an energy-saving state (designated as "ES ON" in FIG. 2). In various embodiments, a WNAN 12 in an energy-saving state may no longer provide a cell 14, and may be powered down or in some other type of reduced-power state.

The center WNAN 12 may perform other ESM operations to adjust its configuration parameters to provide coverage for neighboring cells 14 to accommodate powering down of the perimeter WNANs 12. For example, the center WNAN 12 may operate in an energy-saving compensating state (designated as "ES COMPENSATE"). In this state, center WNAN 12 may provide a single cell 16 that may be used by wireless devices that would normally use one of the neighboring cells 14 during peak traffic.

Other self-optimization operations, performed for a variety of other reasons, may adjust configuration parameters of a WNAN such as center WNAN 12 in FIG. 2 in a manner that conflicts with how the configuration parameters are adjusted by an ESM operation. For example, a coverage and capacity optimization ("CCO") operation may adjust a configuration parameter in one manner to provide better coverage for wireless devices in a particular area. An ESM operation may adjust the same configuration parameter in another manner, e.g., shut it down. These configuration parameter adjustments may conflict.

Accordingly, in various embodiments, a WNAN may be configured to coordinate a plurality of self-optimization operations to reduce conflicts between changes to configuration parameters of the WNAN caused by the self-optimization operations. These self-optimization operations may include but are not limited to load balancing, handover performance optimization, CCO, inter-cell interference mitigation, radio/transport parameter optimization, ESM, and so forth. "Configuration parameters" of WNANs may include but are not limited to downlink transmission ("DL Tx") power, antenna tilt, antenna azimuth, and so forth.

Figure 3:
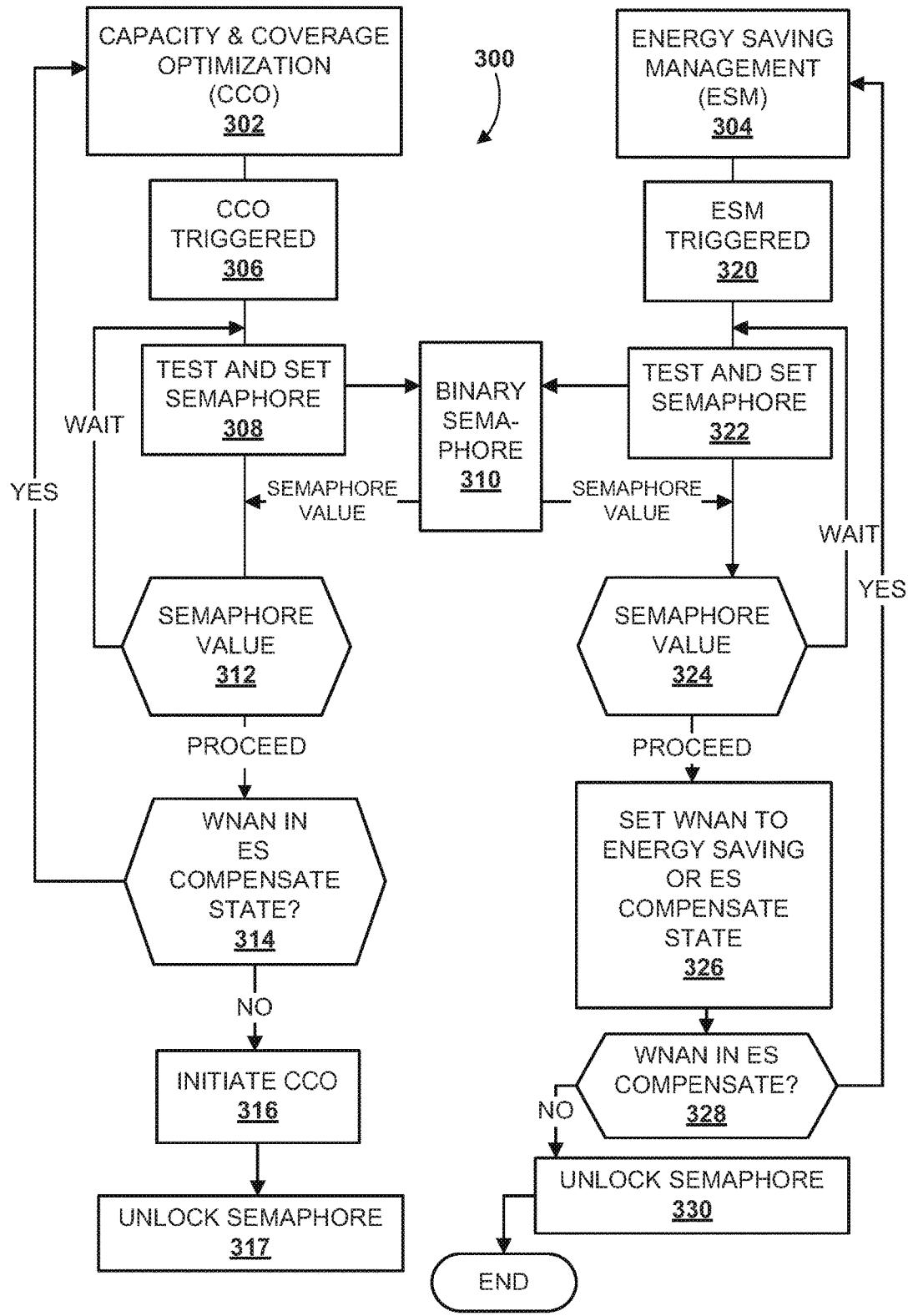
FIG. 3 schematically depicts an example method that may be performed by a WNAN, in accordance with various embodiments.

FIG. 3 depicts an example method 300 that may be performed by a WNAN such as a WNAN 12 of FIG. 1 or 2 to coordinate multiple self-optimization operations to avoid conflicts. In this example, two self-optimization operations, CCO 302 and ESM 304, are depicted. However, this is not meant to be limiting, and more than two self-optimization operations may be selectively coordinated to avoid conflicts in changes to configuration parameters. Moreover, these self-optimization operations may include other types of self-optimization operations; CCO and ESM are used in FIG. 3 for illustrated purposes only.

In various embodiments, at block 306, a CCO may be triggered by various events. For example, a WNAN 12 such as an eNB or base station may analyze data received from various sources (e.g., wireless devices) and determine that capacity and/or coverage may be improved if one or more configuration parameters of the WNAN 12 are changed.

At block 308, WNAN 12 may perform an atomic test and set command on a binary semaphore 310 (e.g., stored in memory of WNAN 12), to determine whether the semaphore is in a locked state. For example, the binary semaphore may be set to a locked state, and its previous value (locked or unlocked state) may be returned as indicated by the "SEMAPHORE VALUE" arrow. At block 312, this previous value may be examined. In various embodiments, if the previous value of the binary semaphore 310 is locked, that may indicate that another self-optimization operation, such as ESM 304, has locked the semaphore, has recently adjusted, is currently adjusting or will be soon adjusting one or more configuration parameters of WNAN 12. In such case, method 300 may refrain from initiating the CCO operation until binary semaphore 310 becomes unlocked. For example, as shown by the "WAIT" arrow in FIG. 3, method 300 may go back and retest and reset binary semaphore 310 until the test and set command returns a previous value that indicates the semaphore has been unlocked (e.g., by another process).

If at block 312 the previous state of binary semaphore 310 is determined to be unlocked, then method 300 may proceed to block 314, and it may be determined whether the WNAN 12 is currently in an energy-saving compensating state (also referred to herein as an "ES COMPENSATE state). If WNAN 12 is currently in the ES COMPENSATE state, then WNAN 12 may not need to initiate CCO because it is currently extending coverage (e.g., as shown in FIG. 2) to compensate for other shut-down cells. In such case, the CCO may not be initiated and method 300 may proceed back to the beginning (e.g., waiting for CCO or ESM to be triggered). However, if WNAN 12 is not currently in the ES COMPENSATE state, then at block 316, the WNAN may initiate the CCO, and then unlock the semaphore at block 317.

Method 300 may include another track that begins at block 320 when an ESM operation is triggered. An ESM operation may be triggered by various events. For example, an ESM operation may be triggered in one or more WNANs 12 during a transition from peak traffic (e.g., shown in FIG. 1) to non-peak traffic (e.g., shown in FIG. 2). For example, an ESM operation may be triggered on the perimeter WNANs 12 to cause them to transition into energy-saving states. Similarly, an ESM operation may be triggered on the center WNAN 12, to enable it to provide coverage for the neighboring cells 14 to accommodate powering down of the perimeter WNANs 12.

At block 322, binary semaphore 310 may be tested and set, e.g., by the WNAN. Similar to block 308, the binary semaphore 310 may be set to a locked state, and its previous value (e.g., locked or unlocked state) may be returned. If at block 324 the previous value was locked, then method 300 may refrain from initiating the ESM operation until binary semaphore is unlocked (e.g., as shown by the WAIT arrow).

If the previous value of binary semaphore 310 was unlocked, then method 300 may proceed to block 326, and the ESM operation may be initiated. For example, in FIG. 3, the ESM operation at block 326 may be to cause the WNAN to enter into an energy-saving state or an ES COMPENSATE state.

At block 328, it may be determined whether the WNAN is in ES COMPENSATE state. If the WNAN is in the ES COMPENSATE state ("yes"), then method 300 may proceed back to the beginning (e.g., back to block 304). However, if at block 328, the WNAN is determined to not be in the ES COMPENSATE state (e.g., when the WNAN is in the ENERGY SAVING STATE), then method 300 may proceed to block 330, where the binary semaphore 310 may be unlocked, after which method 300 may end (e.g., because the WNAN has powered down).

Figure 4:
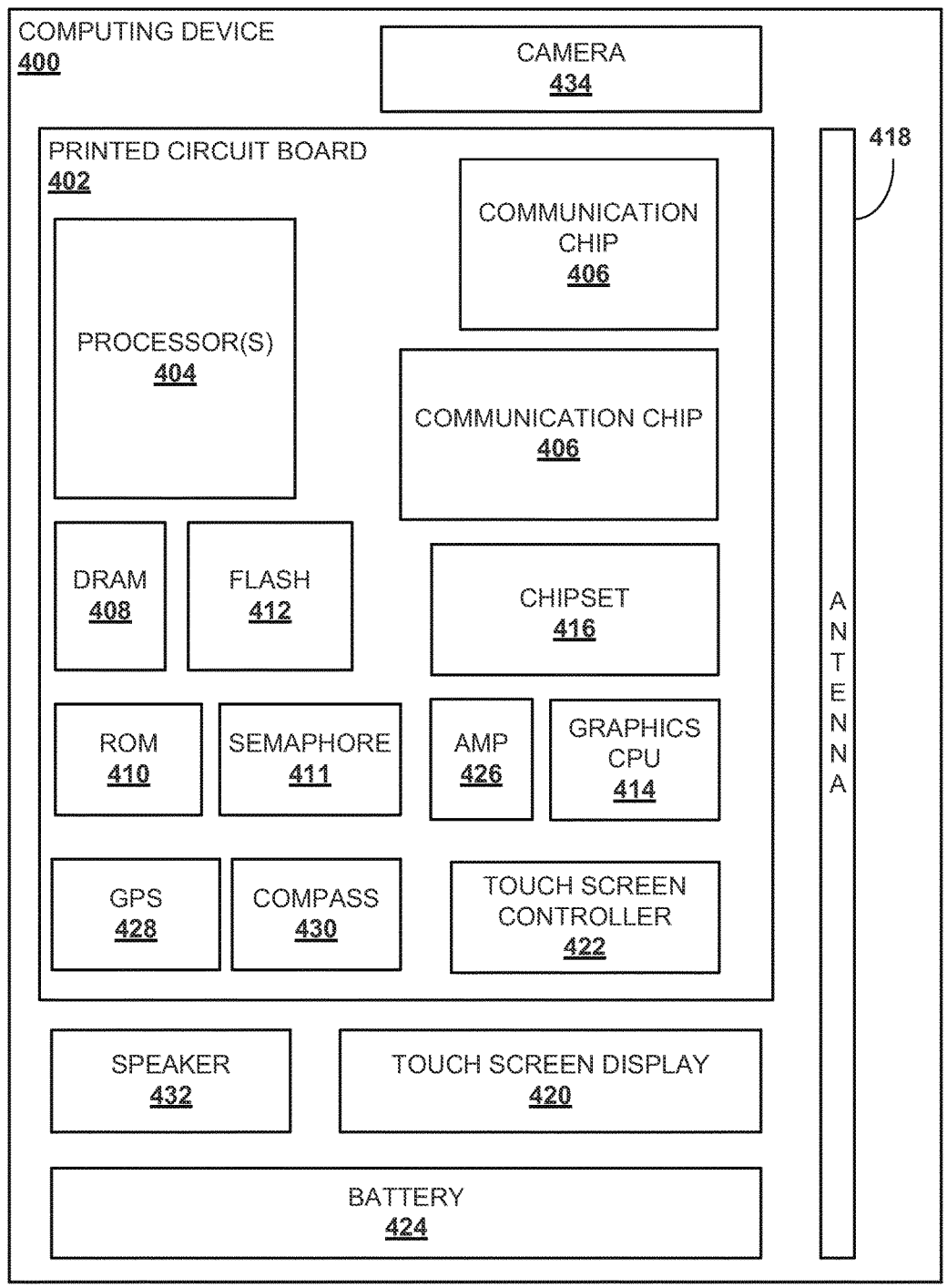
FIG. 4 schematically depicts a computing device that may be configured to implement disclosed techniques, in accordance with various embodiments.

FIG. 4 illustrates a computing device 400 in accordance with various embodiments. The computing device 400 houses a printed circuit board ("PCB") 402. The PCB 402 may include a number of components, including but not limited to a processor 404 and at least one communication chip 406. The processor 404 may be physically and electrically coupled to the PCB 402. In various embodiments, the at least one communication chip 406 may also be physically and electrically coupled to the PCB 402. In further implementations, the communication chip 406 may be part of the processor 404.

Depending on its applications, computing device 400 may include other components that may or may not be physically and electrically coupled to the PCB 402. These other components include, but are not limited to, volatile memory (e.g., dynamic random access memory 408, also referred to as "DRAM"), non-volatile memory (e.g., read only memory 410, also referred to as "ROM"), one or more semaphores 411 (which may in some embodiments reside in various memory), flash memory 412, a graphics processor 414, a digital signal processor (not shown), a crypto processor (not shown), a chipset 416, an antenna 418, a display (not shown), a touch screen display 420, a touch screen controller 422, a battery 424, an audio codec (not shown), a video codec (not shown), a power amplifier 426, a global positioning system ("GPS") device 428, a compass 430, an accelerometer (not shown), a gyroscope (not shown), a speaker 432, a camera 434, and a mass storage device (such as hard disk drive, a solid state drive, compact disk ("CD"), digital versatile disk ("DVD")) (not shown), and so forth.

In various embodiments, volatile memory (e.g., DRAM 408), non-volatile memory (e.g., ROM 410), flash memory 412, and the mass storage device may include programming instructions configured to enable computing device 400, in response to execution by processor(s) 404, to practice all or selected aspects of method 300.

The communication chip 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Wi-Fi (IEEE 802.11 family), WiMAX (IEEE 802.16 family), IEEE 802.20, Long Term evolution ("LTE"), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

The processor 404 of the computing device 400 may include an integrated circuit die packaged within the processor 404. In various embodiments, the integrated circuit die of the processor 404 may include one or more devices, such as transistors or metal interconnects, that are formed to facilitate coordination of self-optimization operations using one or more techniques described herein. The term "processor" may refer to any device or portion of a device that processes electronic data from registers and/or memory to transform that electronic data into other electronic data that may be stored in registers and/or memory.

The communication chip 406 may also include an integrated circuit die packaged within the communication chip 406. In various embodiments, the integrated circuit die of the communication chip 406 may include one or more devices, such as transistors or metal interconnects, that are formed to facilitate coordination of self-optimization operations using one or more techniques described herein.

In various implementations, the computing device 400 may be a laptop, a netbook, a notebook, an ultrabook, a smart phone, a tablet, a personal digital assistant ("PDA"), an ultra mobile PC, a mobile phone, a desktop computer, a server, a printer, a scanner, a monitor, a set-top box, an entertainment control unit, a digital camera, a portable music player, or a digital video recorder. In further implementations, the computing device 400 may be any other electronic device that processes data.

The following paragraphs describe examples of various embodiments. In various embodiments, a plurality of self-optimization operations, including an energy-saving management operation and a capacity and coverage optimization operation, may be coordinated to reduce conflicts between changes to configuration parameters of a wireless network access node caused by the self-optimization operations.

In various embodiments, the energy-saving management operation may adjust the configuration parameters at off-peak times to provide coverage for neighboring cells to accommodate powering down of wireless network access nodes of the neighboring cells. In various embodiments, the energy-saving management operation may cause the wireless network access node to enter into an energy-saving state or energy-saving compensation state. In various embodiments, the changes to configuration parameters caused by the capacity and coverage optimization operation or other self-optimization operations may include changes to power of downlink transmissions, changes to antenna tilt, or changes to antenna azimuth.

In various embodiments, the plurality of self-optimization operations may be coordinated using a semaphore. In various embodiments, may be detected that triggers a self-optimization operation, and it may be determined whether the semaphore is in a locked or unlocked state before the self-optimization operation is initiated. In various embodiments, an atomic test and set command may be performed to determine whether the semaphore is in the locked or unlocked state. In various embodiments, where it is determined that the semaphore is in a locked state, the self-optimization algorithm may not be initiated.

Computer-readable media (including non-transitory computer-readable media), methods, systems and devices for performing the above-described techniques are illustrative examples of embodiments disclosed herein.

Although certain embodiments have been illustrated and described herein for purposes of description, a wide variety of alternate and/or equivalent embodiments or implementations calculated to achieve the same purposes may be substituted for the embodiments shown and described. This application is intended to cover any adaptations or variations of the embodiments discussed herein. Therefore, it is manifestly intended that embodiments described herein be limited only by the claims and the equivalents thereof.

What is claimed is:

1. An apparatus to be employed in an evolved nodeB (eNB), the apparatus comprising:
one or more processors operably coupled with one or more non-transitory computer readable media, the one or more processors are to execute instructions to implement a plurality of self-organizing network (SON) functions, wherein each SON function of the plurality of SON functions comprises SON coordination functionality to coordinate configuration parameter changes among the plurality of SON functions, and wherein, to operate the SON coordination functionality of an energy savings management (ESM) function of the plurality of SON functions, the one or more processors are to execute the instructions to:
identify a trigger for the eNB to enter an energy savings (ES) compensation state to compensate for a cell provided by another eNB that is to enter an energy saving (ES) state;
determine whether one or more configuration parameters are currently being changed for the eNB by a SON function of the plurality of SON functions other than the ESM function; and
instruct the eNB to initiate the ES compensation state when the one or more configuration parameters are not currently being changed by the SON function other than the ESM function.

2. The apparatus of claim 1, wherein the one or more processors are to execute the instructions to:
instruct the eNB to not initiate the ES compensation state based on a determination that the one or more configuration parameters are currently being changed.

3. The apparatus of claim 1, wherein, to instruct the eNB to initiate the ES compensation state, the one or more processors are to execute the instructions to:
instruct the eNB to adjust at least one configuration parameter of the one or more configuration parameters.

4. The apparatus of claim 1, wherein the eNB is to be triggered by the ESM function to compensate the other eNB at off-peak times to provide coverage to accommodate powering down of the other eNB.

5. The apparatus of claim 1, wherein the SON function other than the ESM function is a capacity and coverage optimization (CCO) function.

6. The apparatus of claim 1, wherein the one or more configuration parameters include one or more of a downlink transmission power, an antenna tilt, or an antenna azimuth.

7. One or more non-transitory computer readable media (NTCRM) including instructions, wherein execution of the instructions by an evolved nodeB (eNB) is to cause the eNB to:
implement a plurality of self-organizing network (SON) functions, wherein each SON function of the plurality of SON functions comprises SON coordination functionality to coordinate configuration parameter changes among the plurality of SON functions, wherein, to operate the SON coordination functionality of an energy savings management (ESM) function of the plurality of SON functions, execution of the instructions is to cause the eNB to:
determine whether the eNB is to be activated to compensate for another eNB that is to enter an energy saving (ES) state;
determine whether one or more configuration parameters are currently being changed for the eNB by a capacity and coverage optimization (CCO) function, wherein the CCO function is among the plurality of SON functions;
instruct the eNB to not initiate an ES compensate state when it is determined that the one or more configuration parameters are being changed by the CCO function such that the eNB will not compensate for the other eNB that is to enter the ES state.

8. The one or more NTCRM of claim 7, wherein execution of the instructions is to cause the eNB to:
instruct the eNB to initiate the ES compensate state when it is determined that the one or more configuration parameters are not being changed by the CCO function such that the eNB will compensate for the other eNB after the other eNB enters the ES state.

9. The one or more NTCRM of claim 8, wherein to instruct the eNB to initiate the ES compensate state, execution of the instructions is to cause the eNB to:
instruct the eNB to adjust at least one configuration parameter of the one or more configuration parameters.

10. The one or more NTCRM of claim 7, wherein execution of the instructions is to cause the eNB to:
determine whether the eNB is currently in an ES state; and
refrain from instructing the eNB to initiate the ES compensate state when it is determined that the eNB is currently in the ES state.

11. The one or more NTCRM of claim 7, wherein the one or more configuration parameters include one or more of a downlink transmission power, an antenna tilt, or an antenna azimuth.

12. The one or more NTCRM of claim 7, wherein, to determine whether the one or more configuration parameters are currently being changed by the CCO, execution of the instructions is to cause the eNB to:
test a semaphore to determine whether the semaphore is in a locked state; and
set the semaphore to the locked state when it is determined that the semaphore is not in the locked state.

13. An apparatus to be employed as an evolved nodeB (eNB), the apparatus comprising:
a processor operably coupled with a memory, wherein the processor is to operate one or more self-organizing network (SON) functions including a capacity and coverage optimization (CCO) function, wherein each SON function of the one or more SON functions comprises SON coordination functionality to coordinate configuration parameter changes among the one or more SON functions, wherein, to operate the SON coordination functionality of the CCO function, the processor is to execute instructions to:

detect an event that triggers the eNB to perform a CCO procedure for a cell provided by the eNB, determine whether one or more configuration parameters are currently being changed for the eNB by a SON function of the one or more SON functions that is different than the CCO function in response to the detection, and instruct the eNB to initiate performance of the CCO procedure based on a determination that the one or more configuration parameters are not currently being changed by the SON function that is different than the CCO function.

14. The apparatus of claim 13, wherein the processor is to execute the instructions to instruct the eNB to not initiate performance of the CCO procedure based on a determination that the one or more configuration parameters are currently being changed.

15. The apparatus of claim 13, wherein the processor is to execute the instructions to instruct the eNB to adjust at least one configuration parameter of the one or more configuration parameters.

16. The apparatus of claim 13, wherein the SON function other than the CCO function is an energy savings management (ESM) function among the one or more SON functions.

17. The apparatus of claim 13, wherein the one or more configuration parameters include one or more of a downlink transmission power, an antenna tilt, or an antenna azimuth.

* * * * *